United States Patent
Hajjar

(10) Patent No.: US 6,839,306 B1
(45) Date of Patent: Jan. 4, 2005

(54) OPTICAL NEAR-FIELD SECOND SURFACE RECORDING

(75) Inventor: Roger A. Hajjar, San Jose, CA (US)

(73) Assignee: TeraStar Corporation, Milpitas, CA (US)

( * ) Notice: Subject to any disclaimer, the term of this patent is extended or adjusted under 35 U.S.C. 154(b) by 646 days.

(21) Appl. No.: 09/919,368

(22) Filed: Jul. 30, 2001

Related U.S. Application Data

(60) Provisional application No. 60/221,585, filed on Jul. 28, 2000.

(51) Int. Cl.⁷ .............................................. G11B 11/00
(52) U.S. Cl. ............................... 369/13.33; 369/13.35; 369/283
(58) Field of Search ......................... 369/13.13, 13.33, 369/13.32, 13.24, 112.01, 13.35, 13.4, 99, 283, 286, 44.5, 44.13–44.14, 13.55, 112.24, 126, 44.23, 44.24, 13.17–13.19, 275.2, 275.3; 428/694 MM

(56) References Cited

U.S. PATENT DOCUMENTS

| | | | | |
|---|---|---|---|---|
| 5,148,421 A | * | 9/1992 | Satoh et al. | 369/44.23 |
| 6,061,322 A | * | 5/2000 | Jain et al. | 369/99 |
| 6,243,350 B1 | | 6/2001 | Knight et al. | 369/126 |
| 6,449,221 B1 | * | 9/2002 | Knight et al. | 369/13.35 |
| 6,603,713 B1 | * | 8/2003 | Novotny et al. | 369/13.17 |
| 6,724,694 B2 | * | 4/2004 | Knight et al. | 369/13.55 |

* cited by examiner

*Primary Examiner*—Ali Neyzari
(74) *Attorney, Agent, or Firm*—Fish & Richardson P.C.

(57) ABSTRACT

A near-filed optical storage technique based on the "second surface" recording, where the optical storage medium is designed to have the recording layer formed between the reflective layer and the optically transparent substrate, and optical head and the medium maintain the near-filed configuration to achieve a numerical aperture greater than unity at the recording layer.

15 Claims, 2 Drawing Sheets

OPTICAL NEAR-FIELD SECOND SURFACE RECORDING

This application claims the benefit of U.S. Provisional Application No. 60/221,585 filed on Jul. 28, 2000.

BACKGROUND

This application relates to optical data storage, and more particularly, to optical near-field data storage.

Various optical storage devices and systems have been developed. One type of optical storage systems use an optical head to focus a monochromatic optical beam to a small spot on a recording layer of a storage medium for reading or writing data. The optical head may be positioned over the medium by a spacing greater than one wavelength, i.e., in a "far-field" optical configuration, where the optical energy is coupled between the optical head and the medium by light propagation. An optical head with a large numerical aperture can produce a small spot size. The diffraction effect in light propagation, however, limits the numerical aperture to less than unity. The areal density of such an optical storage device, hence, is limited by this diffraction-limited spot size which has a lower limit on the order of one half wavelength.

An optical storage system may also be configured to operate in a "near-field" configuration to achieve an areal density for data storage higher than that of the far-field configuration. In a typical near-field configuration, the optical head is spaced from the optical medium by a distance on the order of or less than one wavelength of the optical energy. The optical coupling between the optical head and the medium, therefore, can be effectuated at least in part by evanescent coupling, with or without light propagation. Some near-field devices couple optical energy through both evanescent coupling and coupling through light propagation. An effective numerical aperture of the optical head in such a near-field configuration can be greater than unity. Hence, a near-field optical storage system can achieve a focused beam spot size much less than one half wavelength and to realize a high areal storage density.

An optical head of an optical storage device or system generally includes an optical interfacing surface through which optical energy is coupled between the optical storage medium and the optical head. A near-field optical storage device may be designed in a "first surface" recording configuration, where the optical storage medium is designed to have the reflective layer formed between the recording layer and the substrate. During reading or writing operation, the optical interfacing surface of the optical head and the recording layer of the medium are located on the same side of the substrate of the medium. Hence, the optical beam is coupled from the optical head to a recording layer, or coupled from the recording layer to the optical head by reflection of the reflective layer, without passing through the substrate that supports the reflective layer, the recording layer, and other layers. The See, e.g., U.S. Pat. No. 6,243,350 to Knight et al. Thus, the substrate may not optically transparent. Because the near-field condition requires the optical interfacing surface of the head to be spaced from the surface of the optical medium by less than one wavelength, the optical head for the near-field first surface recording is designed to focus the optical beam essentially at or near the medium surface to achieve the minimum beam size in the recording layer.

SUMMARY

This application discloses a different near-field optical storage technique based on the "second surface" recording, where the optical storage medium is designed to have the recording layer formed between the reflective layer and the optically transparent substrate. During operation, the optical head and the recording layer are located on opposite sides of the substrate. Hence, the optical energy coupled between the optical head and the recording layer transmits through the substrate. The optical head and the medium are designed to maintain the near-field configuration to achieve a numerical aperture greater than unity at the recording layer.

DETAILED DESCRIPTION

In general, the near-field second surface recording of this application uses a thick transparent substrate so that the substrate surface facing the optical head is sufficiently away from the recording layer to make the image of the beam on that substrate surface out of focus. The optical intensity on that substrate surface is small due to the large unfocused beam cross section to maintain the thermal heating on that substrate surface below a threshold level where thermal-induced effects such as the spot formation on the optical head no longer adversely affect the normal operation of the storage device. The transparent substrate is designed to have a flat and smooth surface facing the optical head to eliminate adverse effects associated with flying the optical head over the conventional grooved substrate surface. A precision grating structure is formed via photolithography in the medium as the optical servo pattern to produce optical servo signals in the reflected beam. The refractive index of the transparent substrate is equal to or greater than the numerical aperture of the optical head to ensure the near-field configuration.

Figure 1:
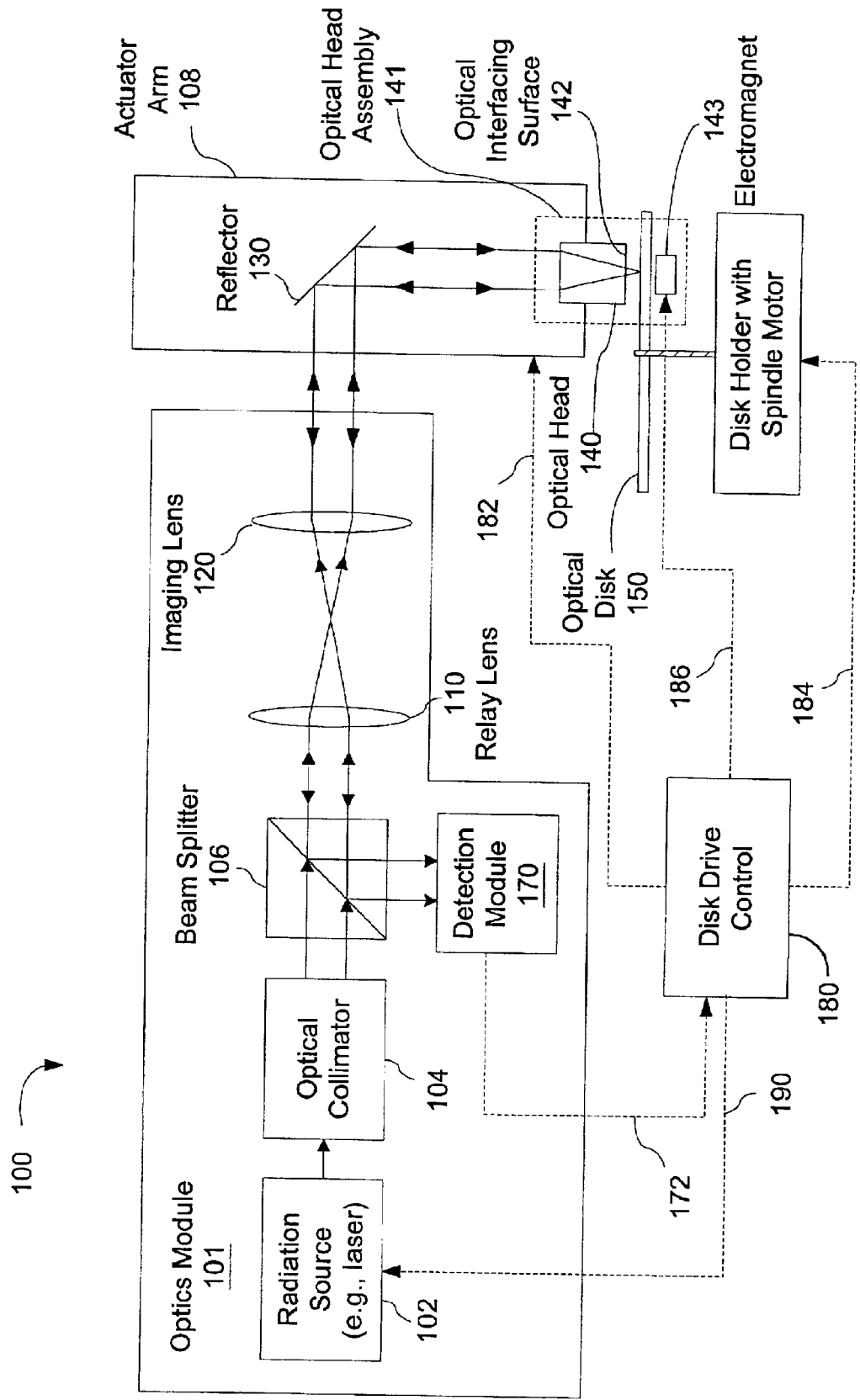
FIG. 1 shows one embodiment of an optical disk drive based on optical near-field second surface recording.

FIG. 1 illustrates one embodiment of an optical storage system 100 for the near-field second surface recording. An optical head assembly 141 is provided for reading data from or writing data to an optical disk 150. The optical head assembly 141 includes an optical head 140 which coupling optical energy to and from the disk 150 for reading or writing operations. Optionally, when the disk 150 requires a magnetic field modulation for writing data, an electromagnet 143 is also included in the optical head assembly 141 but is located on the opposite side of the disk 150 at the same location as the optical head 140 for the second surface recording. The electromagnet 143 operates as an inductive writer to change the direction of the magnetic domain of a spot at which the optical beam is focused by the optical head 140. A radiation source 102 such as a laser produces a beam at a specified wavelength for recording and retrieving data. The optical disk 150 includes at least one storage layer for data storage. The storage layer is formed of a suitable material such as a magneto-optical material for magnetic field modulation ("MFM") recording, a magneto-optical material for light intensity modulation, direct overwrite ("LIMDOW") recording, or a phase-change recording material. Data is spatially distributed and stored in the storage layer by a suitable encoding method. An optical beam from the radiation source 102 is collimated by an optical collimator 104 and then projected to the optical head 140 by a relay lens 110 and an imaging lens 120.

A disk holding unit 160 holds the optical disk 150 in contact with the optical head 140 during operation for coupling optical energy between the optical head 140 and the disk 150. The optical disk 150 may be a removable medium or a fixed medium. The disk holding unit 160 includes a spindle for holding the disk 150 and a spindle motor that rotates the disk 150 around the spindle at a desired speed. A disk load and unload unit may also be included when the disk drive 100 is the removable type in which a disk can be removed and a different disk can be loaded.

The optical head 140 is configured to produce a lensing effect and thereby to focus the beam to a desired recording layer in the disk 150. The optical head 140 also couples the reflected beam from the disk 150 to a detection module 170 that includes at least one data detector to extract data signals from the reflected beam and a servo detector to produce a tracking error signal indicating the relative position of the beam from a desired track on the disk 150. The optical head 140 has an optical interfacing surface 142 through which the optical energy is coupled between the head 140 and the disk 150. The optical head 140 also has an air bearing surface ("ABS") that is substantially coplanar with the optical interfacing surface 142 to allow the optical head 140 to suspend or "fly" over the spinning disk 150 via the aerodynamic interaction. As part of the overall near-field configuration requirements, the spacing between the optical interfacing surface and the surface of the disk 150 is less than one wavelength of the optical energy to allow for evanescent coupling between the optical head 140 and the disk 150 and the total numerical aperture of the optical head 150 is greater than unity to ensure a portion of light rays can only be coupled between the optical head 140 and the disk 150 via the evanescent coupling.

The system 100 implements a beam splitter 106 in the optical path to guide the reflected beam from the disk 150 to the detection module 170. The output beam from the radiation source 102 may be polarized and the beam splitter 106 may be a polarizing prism in order to transmit the output beam while directing the reflected beam to the detection module 170 by using a polarization rotator (e.g., a quarter wave plate between the beam splitter 106 and the disk 150).

The optical system 100 also includes an actuator 108 to hold and move the optical head 140 over desired positions of the disk 150 for reading or writing data. The actuator 108 includes a mechanism to confine the movement of the head 150 along the z direction substantially perpendicular to the disk 150 with minimum lateral movement along the disk 150 when the actuator 108 places the optical head 140 over a selected track on the disk 150. A reflector 130 may be placed on the actuator 108 to couple radiation to and from the optical head 140 so that the beam impinging upon the disk 150 is substantially perpendicular to the disk surface. The optical head 140 may be engaged to the actuator 108 by a suspension arm. Either a linear actuator or a rotary actuator may be used.

Optical elements, including the light source 102, the detection module 170 and beam guiding elements 106, 110, 120, 130, and the optical head 140, may be fixed relative to one another with a predetermined spatial relation. The light source 102, the collimator 104, the beam splitter 106, the detection module 170, and beam guiding elements 110, 120, may be fixed in an optics module 101. The optics module 101 may be fixed on a base of the disk drive 100 to form a fixed optics module or mounted on the actuator 108 to move with the actuator 108 as a movable optics module.

A disk drive control 180 is used to control the operations of various parts of the system 100. The control 100 generates a control signal 182 to control the operation of the actuator 108 and to receive the signal 172 from the detection module 170 that includes the tracking error signal or the read-only signal. When the disk 150 is read, the signal 172 also includes the magneto-optical signal or the phase change signal embedded with data to be read. For writing data to the disk 150, the control 180 produces a data signal 186 to modulate the magnetic field produced by the electromagnet 143 in the optical head assembly 141. The control unit 180 also controls one or more beam-steering devices that control the direction of the beam to the optical head 140 in response to the tracking error signal. In addition, the control unit 180 may produce a control signal 184 to control the operations of the disk holder 160 such as loading, unloading, and spinning the disk 150 with the spindle motor, and a laser control signal 190 for controlling the laser 102.

Figure 2:
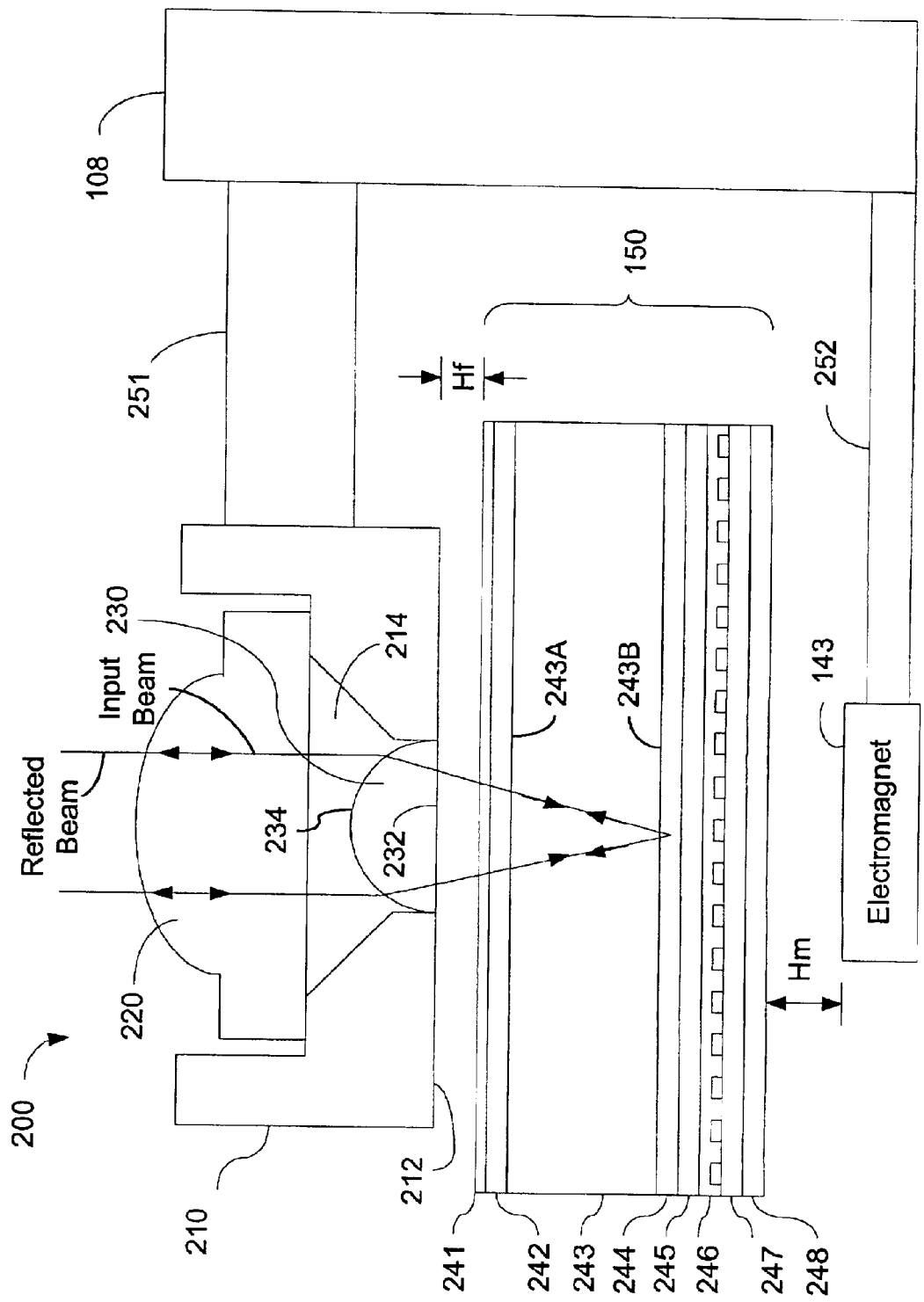
FIG. 2 shows one embodiment of the optical head assembly and the second surface optical disk.

FIG. 2 illustrates one embodiment 200 of the optical head assembly 141 and the respective design of the optical disk 150 for the second surface recording. The optical head 140 includes an objective lens 220 and a coupling lens 230 to couple the beam to and from the disk 150. A head carrier 210 is used to hold the objective lens 220 and the coupling lens 230 relative to each other and is engaged to the actuator 108 through an actuator suspension 251. The actuator suspension 251 may include a rigid actuator arm to move the head 140 laterally on the disk 150 and a suspension member to engage carrier 210 to the actuator arm so that the head 140 can move vertically to the disk 150.

In this embodiment, the objective lens 220 and the coupling lens 230 are spatially fixed to the head carrier 210 and have predetermined spacing from each other. Alternative implementations may use an actuator to finely adjust the spacing between the objective lens 220 and the coupling lens 230. The carrier 210 is configured to have an optical transparent path 214 where the lenses 220 and 230 are placed. The bottom surface 212 of the carrier 210 is the air-bearing surface and may be made from or coated with a wear resistant glass or ceramic material. During normal operation, the flight height Hf of the optical head 140 is less than one wavelength of the light, e.g., about 25 to 125 nm, so that the otherwise totally reflected light at the interfacing surface 232 can be coupled through the air gap into the disk 150 by evanescent coupling.

The coupling lens 230 may be made of a high-index optical material to produce a large effective numerical aperture ("NA"), i.e., $NA = n\sin\theta_0$, where n is the refractive index of the coupling lens 230 and $\theta_0$ is the maximum ray angle from the coupling lens 230 to the focus point. For example, a solid immersion lens ("SIL") or a graded index lens ("GRIN lens") may be used as the coupling lens 230 to a NA greater than unity in the near-field configuration. In the illustrated embodiment, the coupling lens 230 is shown to be a SIL with a spherical optical surface 234 and the opposing second interfacing surface 232. The spacing between the surface 232 and the apex of the spherical surface 234 may be less than or equal to the radius of the spherical surface 234 to form a hemispherical SIL or greater than the radius of the spherical surface 234 to form a super spherical SIL. Details of the coupling lens 230 for near-field operation may be found in the aforementioned U.S. Pat. No. 6,243,350.

A second actuator arm 252 is engaged to the actuator 108 to hold the electromagnet 143 at the same location below the disk 150 with a spacing Hm of about 2 to 10 microns so that the modulation magnetic field from the electromagnet 143 is focused in the recording layer at the same location where the optical beam is focused. The electromagnet 143 and the optical head 140 move together to address different tracks in the disk 150. A slider with an air-bearing surface may be used to hold the electromagnet 143 to form a flying magnetic head. The electromagnet 143 may include an inductive magnetic coil that produces the desired writing magnetic field from a driving current in the coil. Different from the near-field first surface recording where the coil is located on the same side of the disk 150 with the coupling lens 230, this electromagnet 143 and the optical head 140 are on the opposite sides of the disk 140 so that the electromagnet 143 is close to the recording layer without separation by the disk substrate. Hence, the system 100 is a second surface design in its optical configuration but is a first surface design in its magnetic configuration.

The disk 150 is specially designed for the near-field second surface recording. In the embodiment in FIG. 2, the disk 150 is formed on a transparent substrate 243 with two opposing substrate surfaces 243A and 243B. The substrate surface 243A is designed to interface with the optical head 140 for coupling light between the optical head and a recording layer 244 formed over the other substrate surface 243B. Unlike some conventional disks where the substrate is stamped to have servo grooves on both substrate surfaces, the surface 243A is flat and smooth to provide improved mechanical and aerodynamic interaction with the flying optical head 140. This design essentially eliminates the adverse effects associated with, among others, the stamper defect, the curvature error, PC modulus, sputtering defect, air-bearing resonance problems, groove filling, axial runout, or contaminants or debris caught in the grooves. The substrate surface 243A may be covered by a transparent and wear-resistant protection layer 242 such as a Diamond-like carbon layer or other carbon-containing layer of about 10 nm. A layer of a lubricant material 241 of about 1 nm may also be formed over the protection layer 242 to reduce the friction between the optical head 140 and the disk 150 in the event of incidental head contact.

On the other substrate surface 243B that faces away from the optical head 140, the recording layer 244, a partial reflective layer 245, a grating layer 246, and a total reflective layer 247 are sequentially formed. The recording layer 244 may be a MFM magneto-optical layer, a LIMDOW magneto-optical layer, or a phase-change recording layer and may have a thickness of about 10 to 20 nm. The partial reflective layer 245 with a thickness of about 10 to 30 nm may be a thermal conductive layer to transmit some optical energy and reflect the remaining optical energy. The grating layer 246 may have a thickness of about 500 nm and is fabricated to form a layer of servo gating that replaces the conventional servo grooves stamped on the disk substrate. This servo grating may be precisely fabricated to have a 50% duty cycle to produce a large tracking error signal in the reflected beam. The total reflective layer 247 may have a thickness of about 40 to 60 nm and may be formed of a metallic layer. In addition, a protective lacquer layer 248 of about 10 microns may be formed over the total reflective layer 247 to seal the multi-layer structure formed on the substrate surface 243B.

Notably, the active recording layer 244 is formed between flat surfaces and hence is flat and smooth throughout the disk. In some conventional optical disks based on a stamped substrate with grooves, the active recording layer is also grooved like the stamped substrate. It is known that the presence of grooves in the active recording layer produces a groove-related noise signal and hence reduces the signal-to-noise ratio in the received reflected optical signal. This present disk design essentially eliminates this noise and increases the SNR.

In addition, since the active recording layer 244 is flat and smooth, the focusing of the beam can essentially remain constant when addressing different locations of the disk 150. By contrast, in the conventional disks where there are lands and grooves in the active recording layer, the spacing between the active recording layer and the optical head varies from lands to grooves. Hence, the present design eliminates the need for adjusting the beam focusing for the difference between a land and a groove and can optimize the beam focusing to minimize the beam spot on the active recording layer.

In one implementation, a layer of photo-polymer (2P) may be used to form the grating layer 246. A desired grating pattern is then exposed to the 2P layer to form the embedded grating structure in the layer 246 via a photolithographic process.

Alternatively, the servo grating may also formed over the substrate surface 243B by a molding process, an etching process, or photolithographic process in a photo-polymer layer formed over the surface 243B. The substrate surface 243A facing the optical head 140, however, remains a flat and smooth surface.

The near-field configuration of the system 100 includes three parts. First, the total effective numerical aperture of the optical head 140 is greater than unity. This is achieved by the design of the head 140, e.g., by using a SIL. Second, the air gap between the optical head 140 and the disk 150 is less than one wavelength of the light. This is achieved by properly designing the air-bearing surface of the optical head 140, the disk surface, and the head suspension of the actuator.

The third part of the near-field configuration is the optical property of the transparent substrate 243 of the disk 150. This is generally not an issue in the first surface recording configuration since the substrate is not a part of the light path for the evanescent coupling. In the second surface recording, however, the transparent substrate 243 is in the optical path between the optical head 140 and the active recording layer 244. To achieve a total effective numerical aperture greater than unity at the active recording layer, the refractive index of the transparent substrate 243 should be equal to or greater than the numerical aperture of the optical head 140. Hence, if the numerical aperture of the objective lens 220 is 0.65 and the index of the SIL 230 is 2.0, the NA of the optical head 140 is 0.65×2.0=1.3. As a result, the near-field configuration requires the index of the substrate 243 is at least 1.3. Various glass materials may be used to form the substrate 243.

In addition, the thickness of the substrate 243 should be sufficiently large to place the image of the optical beam at the substrate surface 243A out of focus, e.g., at least twice the beam size at the focused location on the recording layer 244. In the above embodiment, the thickness may be about 500 to 700 nm. This thickness requirement on the substrate 243 may be used to achieve a number of advantages. For example, the reflection, including the total internal reflection at the bottom surface 232 of the SIL 230 and the reflection at the disk surface, is out of focus and hence does not significantly affect the detection by the detection module 170. Hence, the detection SNR can be improved. This may also eliminate the need for an anti-reflection coating on the disk surface. In addition, any scattered light produced by contaminant particles or debris deposited either on the SIL 230 or the disk surface is out of focus and hence contributes little to the noise at the detection module 170. The above benefits generally reduce the signal sensitivity to the flying height of the optical head 140 because the interfacing area between the optical head and the disk surface is out of focus and becomes optically less visible to the optical detection module 170.

Yet another advantage of the out of focus at the disk surface is the reduced localized heating by the optical beam at the SIL and the disk surface. This can reduce the probability of "baking" debris on the optical surfaces and hence cause permanent optical damage and the probability of mass transfer due to adsorption which transfers particles from the disk surface to the bottom surface 232 of the SIL 230.

It is further noted that, the electromagnet 243 is separate from the optical head 140 and hence there is no need for forming a mesa at the center of the bottom surface 232 of the SIL 230. This can reduce the probability of damaging the optical head 140 due to incidental head contact and the optical finish of the disk surface. Also, the electromagnet 243 may be eliminated when the recording material 244 is formed of LIMDOW or phase-change materials that do not require external magnetic fields to store data. LIMDOW or phase-change materials may be used to achieve multi-layer storage with two or more active recording layers.

Only a few embodiments are disclosed. However, it is understood that variations and enhancements may be made without departing from the spirit of and are intended to be encompassed by the following claims.

What is claimed is:

1. A device, comprising:
    a disk holder operable to hold and spin an optical disk, said disk having a transparent substrate having first and second opposing substrate surfaces, an active recording layer formed over said second substrate surface, and a reflective layer formed over said active recording layer;
    an optical head with an optical numerical aperture greater than unity and less than a refractive index of the transparent substrate and having an optical interfacing surface which is operable to couple radiation energy to and from the optical disk for reading data from or writing data to the optical disk;
    an actuator engaged to said optical head to move and position said optical head facing the first substrate surface of the disk by a spacing less than one wavelength of the radiation energy; and
    an electromagnet coupled to said actuator and positioned on the same side of the said second substrate surface to produce a magnetic field at a location of said active recording layer where said optical head focuses an optical beam.

2. The device as in claim 1, wherein said first substrate surface is a flat surface.

3. The device as in claim 1, wherein said optical head includes a coupling lens having a first spherical optical surface and a second, opposing optical surface, wherein said optical interfacing surface is a portion of said second optical surface.

4. The device as in claim 3, wherein said optical head includes an objective lens to couple optical energy to or from said coupling lens.

5. The device as in claim 3, wherein said coupling lens is a solid immersion lens.

6. The device as in claim 1, wherein said optical disk further comprising a grating layer formed between said active recording layer and said reflective layer to produce an optical servo signal.

7. The device as in claim 6, wherein said grating layer is formed from a photo-polymer layer.

8. The device as in claim 1, wherein said active recording layer is a flat and smooth layer.

9. The device as in claim 1, wherein said substrate has a thickness to place said first substrate surface out of focus of said optical head.

10. A device, comprising:
    a disk holder operable to hold and spin an optical disk, said disk having a transparent substrate having first and second opposing substrate surfaces, a active recording layer formed over said second substrate surface, and a reflective layer formed over said active recording layer, wherein said first substrate surface is flat;
    an optical head with an optical numerical aperture greater than unity and less than a refractive index of the transparent substrate and having an optical interfacing surface which is operable to couple radiation energy to and from the optical disk for reading data from or writing data to the optical disk; and
    an actuator engaged to said optical head to move and position said optical head facing the first substrate surface of the disk by a spacing less than one wavelength of the radiation energy.

11. The device as in claim 10, wherein said active recording layer includes a magneto-optical material for light intensity modulation, direct overwrite ("LIMDOW") recording material.

12. The device as in claim 10, wherein said active recording layer includes a phase-change recording material.

13. A method, comprising:
    causing an optical head to have a total numerical aperture greater than unity;
    causing an optical disk to have a transparent substrate with a first flat substrate surface and a second, opposing substrate surface, a recording layer formed over said second substrate surface, and a reflective layer formed over said recording layer, wherein the transparent substrate has a refractive index greater than said total numerical aperture of said optical head;
    causing said optical head to be used to couple optical energy between the optical head and the optical disk at least in part via evanescent coupling by facing the optical head to said first flat substrate surface to focus light at said recording layer; and
    causing a reflected optical signal from the optical disk to be detected to extract optical servo information.

14. The method as in claim 13, wherein a grating layer is formed between the recording layer and the reflective layer to produce an optical servo signal.

15. The method as in claim 13, further comprising causing an electromagnet to be placed on the opposite of the optical disk to produce a magnetic field at a location in the recording layer where the optical head focuses an optical beam.

* * * * *